United States Patent
Katz

(10) Patent No.: US 8,262,959 B2
(45) Date of Patent: Sep. 11, 2012

(54) APPARATUS AND METHOD FOR RECYCLING SCRAP, INCLUDING AUTOMOTIVE INTERIOR TRIM SCRAP

(75) Inventor: Jean-Jacques Katz, Novi, MI (US)

(73) Assignee: TrimaBond LLC, Manchester, MI (US)

( * ) Notice: Subject to any disclaimer, the term of this patent is extended or adjusted under 35 U.S.C. 154(b) by 196 days.

(21) Appl. No.: 12/715,084

(22) Filed: Mar. 1, 2010

(65) Prior Publication Data

US 2011/0212317 A1    Sep. 1, 2011

(51) Int. Cl.
*B27N 3/02* (2006.01)

(52) U.S. Cl. .......................... 264/115; 264/112

(58) Field of Classification Search .................. None
See application file for complete search history.

(56) References Cited

U.S. PATENT DOCUMENTS

| | | |
|---|---|---|
| 5,807,513 A | 9/1998 | Gebreselassie et al. |
| 6,110,580 A | 8/2000 | Gebreselassie et al. |
| 2006/0144012 A1* | 7/2006 | Manning et al. ............. 52/782.1 |
| 2006/0251881 A1* | 11/2006 | Gilder ........................ 428/317.1 |
| 2007/0066692 A1* | 3/2007 | De Juan Saiz et al. ......... 521/40 |

* cited by examiner

*Primary Examiner* — Mary F Theisen
(74) *Attorney, Agent, or Firm* — Gifford, Krass, Sprinkle, Anderson & Citkowski, P.C.

(57) ABSTRACT

Useful articles are produced from shredded post-industrial (scrap), including post-consumer automotive interior trim parts obtained from vehicles. Feedstock is shredded into a fluff and mixed with an isocyanate prepolymer adhesive composition. The mixture may be placed into a mold, onto a continuous web or between laminating rolls to cure the mixture under pressure. The curing step can take place at room or elevated temperatures and only requires moisture either from the atmosphere or present in the shredded scrap or fluff. The articles produced may natural wood sheets such as Luan or wood composite boards currently adhered with urea-formaldehyde or phenol-formaldehyde resins. Other applications include structural or non-structural parts such as bulk heads, roofs, floors or vertical walls used in automotive vehicles, tractor trailers, recreational vehicles or marine vessels.

19 Claims, 2 Drawing Sheets

APPARATUS AND METHOD FOR RECYCLING SCRAP, INCLUDING AUTOMOTIVE INTERIOR TRIM SCRAP

FIELD OF THE INVENTION

This invention relates generally to recycling. More particularly, the invention resides in apparatus and methods for producing useful articles from shredded scrap, including automotive interior trim parts obtained from vehicles that have reached the end of their useful life.

BACKGROUND OF THE INVENTION

The automotive parts recycling industry produces goods that are entirely or partially based on components recovered from end-of-life products or manufacturing scrap. The process transforms recovered components into "like-new" goods, and yields important economic and environmental benefits. Remanufactured or recycled goods generally have the appearance, performance, and life expectancy of new goods. They meet the same performance standards as, and enjoy warranties similar or identical to, equivalent new goods. In short, remanufactured/recycled products are intended to be identical to products manufactured entirely from raw materials, new parts or components.

Automotive remanufacturing/recycling was roughly a $40 billion market in the U.S. in 2008, based on estimates by the Automotive Parts Remanufacturers Association (APRA). Total vehicle scrappage rate, defined as the ratio of vehicles reaching end-of-life (ELV) to the number of registered vehicles, reached 5.6 percent in 2008, according to R. L. Polk & Co. figures in its annual vehicle population report, based on 249 million registered vehicles. Therefore, each year, nearly 14 million vehicles that reach the end of their useful life are recycled.

Automotive recyclers can now recover nearly 80 percent of the total materials by weight from a vehicle; a motor vehicle contains today around 8-10 percent by weight of plastics (about 257-322 lbs/vehicle), but the proportion of plastic materials being recycled is still extremely low. One key reason is the wide variety of polymers used by the automotive industry: there are about 39 different types of basic plastics in a vehicle today. About 75 percent of plastics (by weight) are covered by 10 plastic grades. Although these polymers are technically recyclable, costs to separate and clean each polymer is much higher, in the vast majority of cases, than purchasing and processing virgin polymers.

Automotive interior soft trim parts are a good example because these multi-layer, multi-material constructions do not generally lend themselves to a straight recycling approach. On the contrary, they require complex, expensive, and usually uncompetitive disassembly and separation operations. This explains why today there are no known commercial recycling processes able to convert post-industrial or post-consumer automotive interior soft trim composites into finished trim panels for re-use in motor vehicles. Such parts include headliners and other interior trim and acoustical panels such as hood/wheelhouse liners, carpets, package trays, A, B, C pillars, visors and trunk trim components. These articles are complex composites of several materials including, but not limited to, nylon, polypropylene, polyester, filled EVA (ethylene vinyl acetate), cellulose films, semi-rigid/flexible thermosetting polyurethane foams, glass, cotton and in some cases natural fibers; these parts are ultimately disposed and discarded in landfills.

Because of their unique multi-layer, multi-material composite structures, headliners are generally viewed as the most difficult automotive interior trim part to recycle; consequently, they provide a good challenge to demonstrate the value and feasibility of new recycling technologies.

Techniques have been disclosed to recycle automotive components, but they rely upon water-based adhesives and intermediate pre-preg sheets, which raises cost and complexity. According to U.S. Pat. Nos. 5,807,513 and 6,110,580, for example, a water-borne binder or adhesive is required to provide binder coverage to all pieces of fluff. Once the mixture of fluff, binder reagent and water are mixed, it must be placed in a cold mold where the blend is formed into a pre-preg sheet. Subsequently, this pre-preg sheet is compressed at elevated temperatures to produce a finished composite trim panel. In addition to requiring another processing step to produce the pre-peg sheet, another shortcoming of existing methods is a shorter pot-life potentially arising from the vigorous mixing of the binder reagent with water and the fluff at room temperature, which could lead to the premature reaction of the binder with water.

It would be therefore highly desirable to develop a rapid, efficient and cost-effective procedure to recycle both manufacturing scrap and post-consumer automotive interior trim parts into a wide variety of panels for subsequent use in vehicles.

SUMMARY OF THE INVENTION

This invention is directed to apparatus and methods for producing useful articles from shredded scrap, including automotive interior trim parts obtained from vehicles that have reached the end of their useful life. The definition of "scrap" is not limited in this regard, however, and may include landfill-bound materials from both post-consumer and post-industrial streams.

According to one preferred embodiment, new and useful molded, shaped transportation trim articles and flat panels are manufactured by shredding post-industrial or post-consumer automotive interior trim scrap or components, such as headliners, trunk trim components or comparable composite parts. Other feedstocks for subsequent grinding and treatment with the binder may be comprised of, but not limited to, carpeting, floor mats, undercarpet spacers, package trays, instrument panels, door panels, wheelhouse covers, trunk load floors and tire covers.

The feedstock is shredded into a fluff and mixed with an isocyanate prepolymer adhesive composition. The mixture may be placed into a mold, onto a continuous web or between laminating rolls to cure the mixture under pressure. The curing step can take place at room or elevated temperatures and only requires moisture either from the atmosphere or present in the shredded scrap or fluff.

The resulting articles, which are thermally and dimensionally stable, have very low VOC emissions and in particular do not release any formaldehyde under accelerated or regular operating conditions, and can be classified as formaldehyde-free, with an E0 rating. When manufactured as flat panels, the articles produced using the invention can replace natural wood sheets such as Luan or wood composite boards currently adhered with urea-formaldehyde or phenol-formaldehyde resins.

Other applications include structural or non-structural parts such as bulk heads, roofs, floors or vertical walls used in automotive vehicles, tractor trailers, recreational vehicles or marine vessels. Molded shaped articles can also be utilized in automotive interior trim applications, including, but not limited to, A, B, C pillars, sound-deadening components, package trays, wheelhouse covers, trunk trim or tire covers.

DETAILED DESCRIPTION OF THE INVENTION

This invention resides in the fabrication of useful articles from scrap, including post-consumer automotive interior trim parts. Such parts may include a combination of the following polymers and fillers including, but not limited to: flexible and semi-rigid polyurethane foam, nylon, polyester, filled EVA (ethylene vinyl acetate), polypropylene, glass fibers, cotton and in some cases other natural fibers, such as flax, kana, hemp, jute, sisal, wheat straw, coconut husk, bamboo among others. The invention does not require the presence of any type of polyurethane foams, as set forth in prior art references, but can accommodate these polymers, if present. Recycling of such articles has proved very difficult in the past due to complex mixtures of polymers and fillers.

The process disclosed herein ordinarily starts with the shredding of manufacturing scrap or post-consumer scrap into small material particles to produce fluff. The average particle size of the fluff typically ranges from ⅜ to ½ inch pieces, but can be modified, if required. A screen, which is an integral part of the shredder apparatus, may be used to determine the final size of the pieces.

Figure 1:
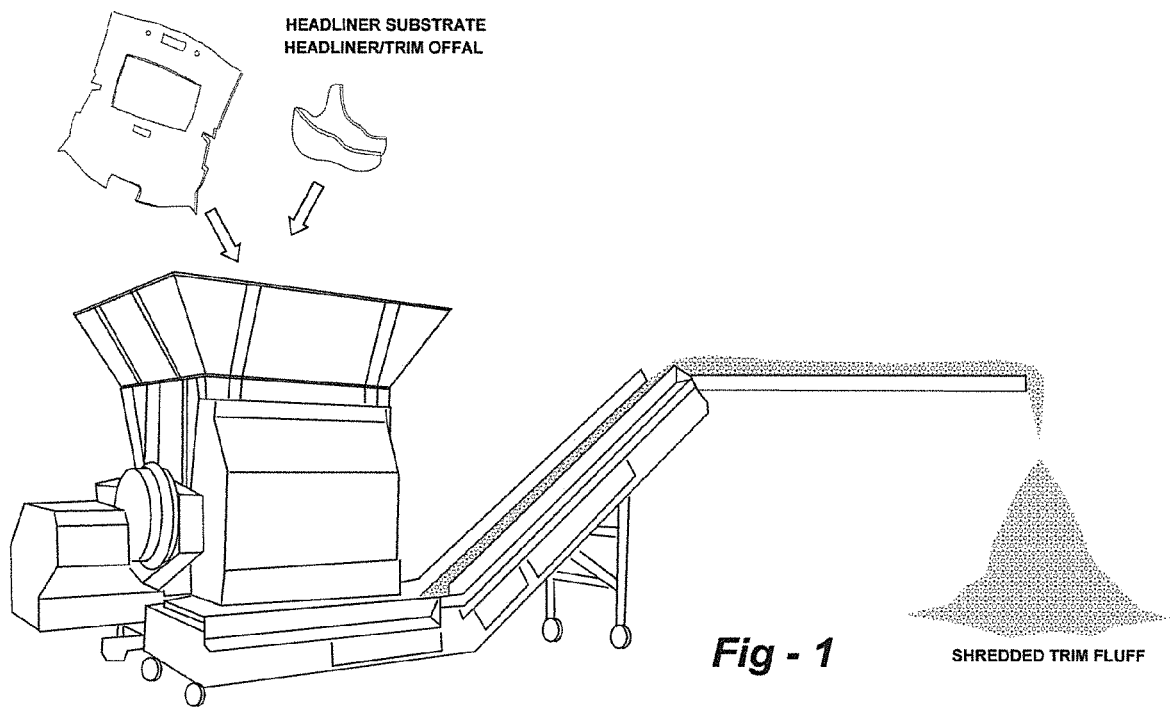
FIG. 1 illustrates scrap material being grinned into fluff.

FIG. 1 is a simplified drawing that shows the grinding or shredding step which converts the scrap material into fluff. While the example identifies headliner, other scrap is meant to encompass other automotive trim streams, such as, but not limited to, carpeting, floor mats, undercarpet spacers, package trays, instrument panels, door panels, wheelhouse covers, trunk trim, and load floors.

In contrast to prior-art processes, the fluff is combined with a curable non-aqueous isocyanate prepolymer adhesive or binder.

The adhesive or binder is comprised of a curable non-aqueous isocyanate prepolymer. The isocyanate prepolymer can be prepared using an isocyanate component, illustratively including a diisocyanate component and/or a polyisocyanate component. As defined, the terminology polyisocyanate is to be construed as including prepolymers and free polyisocyanates. The isocyanate component generally provides reactive groups, i.e., NCO groups, during subsequent reactions. The isocyanate component may be selected from the group of toluene diisocyanate (TDI), methylene diphenyl diisocyanate (MDI), including dimers, trimers, and higher oligomers thereof. A combination of TDI and MDI may also be used, the TDI may be present in the isocyanate component in an amount of from 65 to 80 parts by weight based on 100 parts by weight of the isocyanate component.

The isocyanate component is then reacted with an isocyanate-reactive component to form a prepolymer. The isocyanate-reactive component generally provides hydroxyl groups for reaction with the NCO groups of the isocyanate component. More specifically, the isocyanate-reactive component may include a polyol. The isocyanate-reactive component may also include at least two polyols. Any known polyol suitable for reaction with the isocyanate component is suitable for purposes of the present invention. For example, the isocyanate-reactive component may be selected from the group of polyether polyols, polyoxyalkylene polyols, polyester polyols, graft polyols, polymer polyols, polyols derived from renewable resources, such as, but not limited to, soy polyols, castor oil polyols, canola oil polyols, rapeseed oil polyols, palm oil polyols, and combinations thereof. Examples of suitable polymer polyols include, but are not limited to, polyol dispersions of styrene/acrylonitrile particles (SAN) and polymer-modified polyols such as polyisocyanate polyaddition (PIPA) polyols and poly Harnstoff dispersion (PHD) polyols.

Polyols are added to the isocyanate component in a sufficient ratio to produce a chemically designed curable non-aqueous isocyanate prepolymer having an NCO content ranging, from 5 percent to 15 percent, preferably 10 percent to 14 percent, and meeting targeted viscosities. Reaction between the isocyanate component and the polyol component can be carried out at temperatures ranging from 30° C. to 80° C., preferably 40° C. to 60° C., for periods ranging from 6 to 12 hours.

The adhesive composition may also contain an extender or process oil selected from a series of oil-derived aromatic distillates, refined soy bean oils or a combination thereof; the function of the extender oil, when used, is to tailor the binder viscosity to desired values and has also, at the same time, a diluting effect on the NCO concentration of the binder. The process oil is selected so that it does not chemically react with either isocyanates or polyols. Content of the extender oil may range from 10 to 50 percent by weight of the prepolymer, preferably 20 to 40 percent. Viscosity of the binder, with or without process oil, can also be modified by heating the binder to higher temperatures prior to applying it unto the fluff. Final viscosity of the binder may range from 500 to 5000 cps; in one particular embodiment using shredded headliner scrap, the viscosity of the binder is preferably in the 1500 to 2500 cps range at 30° C.

Binder levels used as the adhesive to produce flat panels or shaped articles will vary depending upon the physical properties required of the finished part, fluff particle size and composition, i.e., the type and amount of polymers and fillers present in the fluff. Levels utilized usually vary between 5 percent and 50 percent, but are preferably in the 10 percent to 30 percent range.

Figure 2:
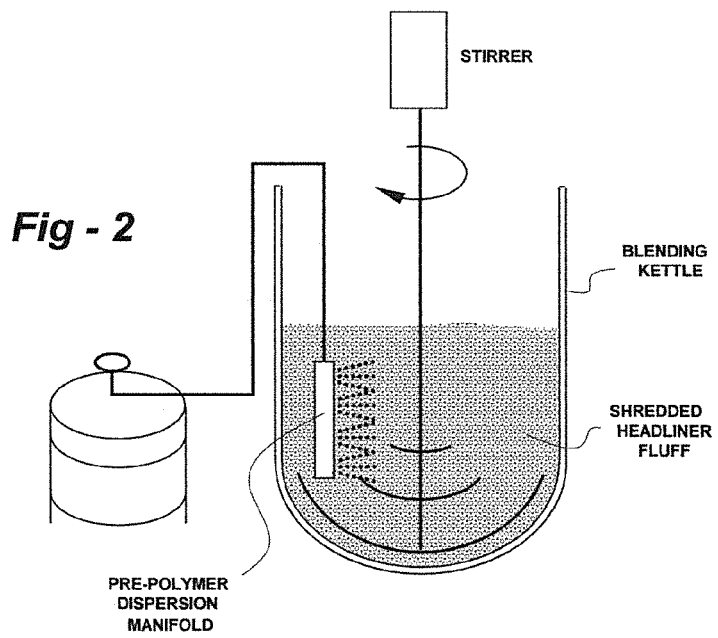
FIG. 2 shows the batch addition of binder to the fluff.
Figure 3:
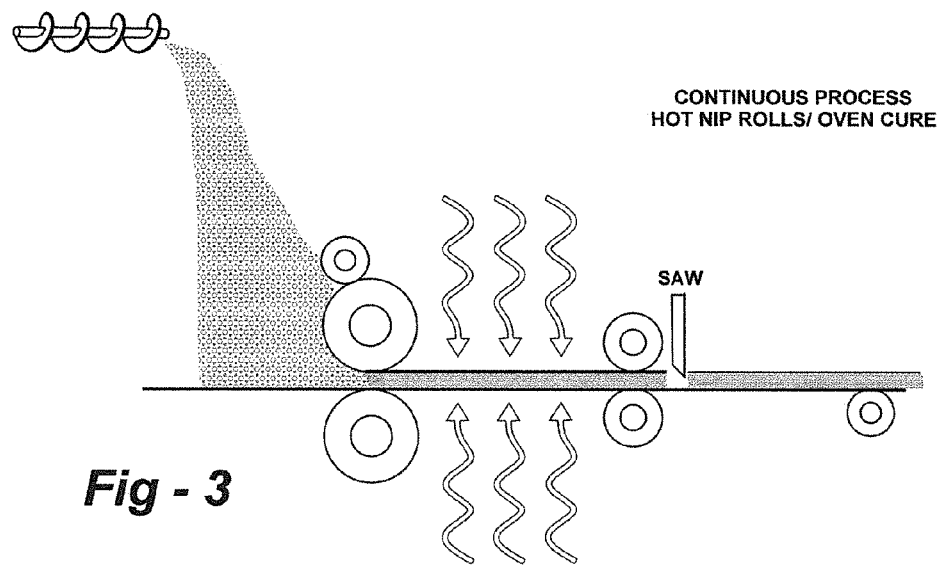
FIG. 3 depicts the production of a molded article in a continuous process.
Figure 5:
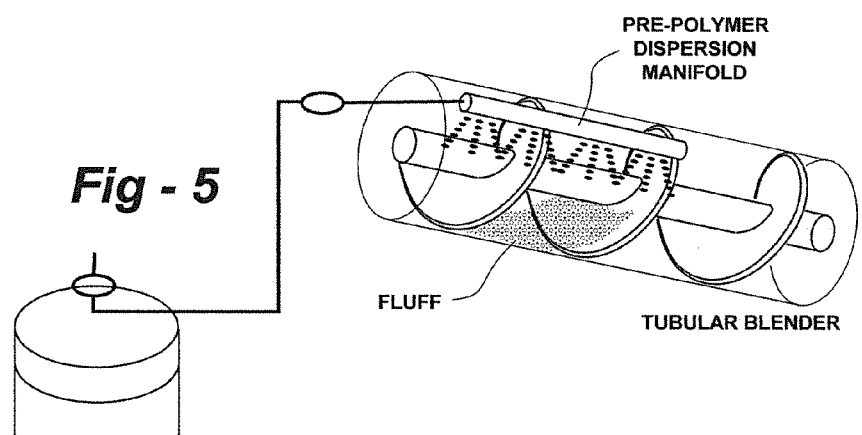
FIG. 5 illustrates the addition of a binder to fluff as part of a continuous process.
Figure 4:
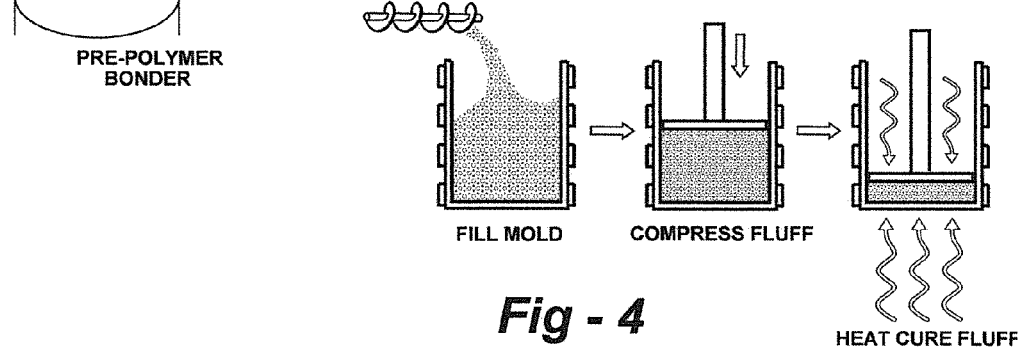
FIG. 4 depicts the production of a molded article in a batch process.

Addition of the binder can either take place in an agitated vessel where the liquid adhesive is metered into the fluff (batch process) or the adhesive can be metered into a tubular vessel at a given flow rate onto the fluff which is transported using, for example, an Archimedes' screw conveyor system (continuous process) or any other comparable system. Thus, according to this description, use of the term "container" refers to any vessel which holds or carries the fluff and adhesive/binder mixture. The conveyor is used as a rotary or variable rate feeder to deliver a measured rate or quantity of fluff blended with the adhesive to the next step in the process. FIG. 2 illustrates the batch addition of the binder to the fluff. FIG. 3 depicts the production of a molded article in a continuous process, and FIG. 4 the production of a molded article in a batch process. FIG. 5 illustrates continuous addition of the binder to the fluff.

As an important improvement over the prior art, the invention does not call for the formation of an intermediate pre-peg sheet. Instead, the fluff and binder mixture can be directly metered into a mold, where it is compressed using press platens; alternatively, the fluff can be dispensed onto a pressurized continuous belt or between laminating rolls, as a continuous web or batting. The resulting cured web can be subsequently cut into flat panels of desired sizes.

Once the fluff has been combined with the adhesive as described, it can be cured by placing the mixture into a mold and exposing this tool at temperatures ranging from 120 to 175° C. for a duration of 1 to 10 minutes or at room temperature (25 to 30° C.) for periods ranging from 1 to 24 hours to produce a molded article. Curing takes place when the isocyanate prepolymer which comprises the adhesive or binder composition reacts with moisture contained in the fluff or in the atmosphere to form a cured adhesive. Alternatively, cure rate of the adhesive can be greatly accelerated by catalysts when molding takes place at room or elevated temperatures.

A catalyst component may be added to the binder composition prior to use to catalyze the reaction between the binder and moisture. The catalyst component is typically not consumed in the reaction to form the cured binder. That is, the catalyst component preferably participates in, but is not consumed by the binder-curing reaction. The catalyst component may include any suitable catalyst or combinations of catalysts known in the art. Suitable catalysts can be formulated to provide a combination of longer pot life and fast cure when used with the isocyanate binders of this invention and the various fluffs to be rebonded. Examples of suitable catalysts include, but are not limited to, gelation catalysts, blowing catalysts, and tin catalysts. In the case of headliner fluff, levels of catalyst can vary from 3.0 to 6.0% based on the amount of polyurethane binder used. In the case of shredded trunk trim material, and depending upon the type of catalyst, levels will vary from 0.1 to 4.0% based on the amount of polyurethane binder used.

As stated above, in contrast to prior-art methods, the present invention does not require the presence of additional water to produce a cured adhesive; moisture content of the fluff does not need to exceed 2% by weight. This is a significant improvement over prior art processes. Thicknesses of articles molded using this process range from 1.5 mm to 10.0 mm with densities in the 50 to 1,000 $g/ft^2$ range.

A further advantage of the present invention disclosure is the ability to apply on either or both sides of the mixture comprised of the fluff and binder adhesive placed in the compression mold, a decorative textile coverstock or other polymeric film, sheet or scrim, without additional adhesive, to produce a laminated trim panel with decorative textile coverstock or other polymeric film, sheet or scrim adhered either on one side or both sides of the trim panel. Processing conditions can be selected from the range supplied for the formation of a panel, as described above. Another benefit of the disclosed disclosure, when the molded article is manufactured at room temperature, is the possibility to laminate temperature-sensitive films, sheets or scrims to the molded article without detrimental effects on the integrity of the said films, sheets or scrims. Examples of such materials with melting points inferior to 250° F. (120° C.) are, but not limited to, low density polyethylene (LDPE), linear low density polyethylene (LLDPE), polypropylene (PP) and polypropylene copolymers, thermoplastic polyolefins (TPO), ethylene vinyl acetate (EVA) and EVA copolymers, polyvinyl chloride (PVC), and polyvinylidene chloride (PVDC).

Lamination of decorative textile coverstock or other polymeric film, sheet or scrim to the molded article can also take place after the mixture of fluff and binder has been molded into an article. In that case, the lamination process consists of dispensing adhesive onto one or both surfaces of the molded article, placing the decorative textile coverstock or other polymeric film, sheet or scrim onto one or both surfaces of the molded article, and locating this composite article in a press under pressure. Adhesion can take place at room temperature if the decorative textile coverstock or other polymeric film, sheet or scrim materials are temperature sensitive, as described above, or at elevated temperature, if the decorative textile coverstock or other polymeric film, sheet or scrim are not temperature sensitive. In an another manufacturing example, the process would consist of dispensing adhesive onto one or both surfaces of the molded article in a continuous process, applying decorative coverstock or other polymeric film, sheet or scrim onto one side or both sides of the panel as discrete sheets, films, scrims or rolls in a continuous operation. The last step, curing, can take place at room temperature if the decorative textile coverstock or other polymeric film, sheet or scrim materials are temperature sensitive, as described above, or at elevated temperature, if the decorative textile coverstock or other polymeric film, sheet, scrim materials are not temperature sensitive.

Flat panels produced in accordance with this invention, including the use of headliner materials as feedstock, can be used in numerous applications, including, without limitation, packaging, automotive applications, recreational vehicles, tractor trailers, or marine vessels for interior trim horizontal non-structural and vertical structural applications, such as trunks, walls, roofs, floors and bulkheads.

In one example, flat panels produced by the method of this invention, using headliner materials as feedstock, can replace traditional wood-based panels, veneers or boards such as Luan or Luan plywood that are widely used today. Luan (or Lauan) also known us red Luan or Phillipine mahogany is not a true mahogany but part of the Shorea family. It is a structurally weak, medium density wood used mostly as an interior facing material. Luan boards are usually marketed as 4 ft×8 ft panels (32 $ft^2$) at a 2.7 mm, 3.0 mm and 5.2 mm thickness and at densities ranging from 140 to 175 $g/ft^2$ depending upon ambient humidity and temperature. Lauan plywood is made from tropical rainforest trees located in South East Asia and raises the issue of sustainable harvesting. Wood resources, in general, are now becoming the focus of vehicle manufacturers, due in part to energy conservation, as well as concern for the depletion of natural resources. Luan emits detectable amounts of formaldehyde in everyday use. Since formaldehyde is classified as a carcinogen by the U.S. EPA (Environmental Protection Agency), there is a growing demand by recreational vehicles manufacturers for panels with very low, or no, formaldehyde emissions (E0 rating). The need for these panels is expected to grow very substantially within the next few years driven by new State of California regulations (CARB II) severely restricting, if not totally eliminating, formaldehyde emissions in recreational vehicles.

Plywood adhesives, such as urea-formaldehyde resins used for interior-grade panels and phenol-formaldehyde resins used for exterior-grade and marine-grade panels have become a point of concern. Both are carcinogenic at high concentrations and emit free formaldehyde, especially urea-formaldehyde based glues. On the other hand, isocyanate-adhered panels, as prepared by the methods described in this invention, are formaldehyde free and meet all future stringent emissions requirements. In addition, these panels exhibit excellent physical properties when compared to equivalent Luan panels and can be manufactured at a precise and predictable densities (150 $g/ft^2$ for example), independently of ambient temperature and relative humidity.

Unlike competitive thermoplastic materials, such as thermoformable composite sheets comprised of polypropylene resin and long chopped glass fibers, which have a tendency to delaminate under stress, panels produced from headliner scrap according to the method of this invention do not require metal reinforcements to secure anchoring of screws used in subsequent panel assembly operations. Furthermore, unlike thermoplastic sheets based on polypropylene resins, which require polymeric scrims, films or additional surface treatments, panels produced by the present invention from headliner scrap exhibit excellent adhesion to glues and other materials required for lamination to other substrates, without the need for additional costly and time-consuming processing steps.

In another example, panels produced by the present invention from headliner scrap can be fabricated using a die-cut press or a water-jet trimmer to produce horizontal load-bearing panels, such as automotive tire covers, package tray substrates, and recreational vehicles' floor or roof panels.

In a further example, an automotive trunk trim part, such as a wheel house cover, or a full trunk liner, which is comprised of a thin sheet of polypropylene resin sandwiched between two layers of non-woven polyester fibers, or scrap produced during water-jet trimming of this same automotive trunk trim part, is shredded; isocyanate binder is added to the resulting fluff, as previously described, and the mixture is placed into a hot mold, and cured at high temperature, as described above. The mold can have the shape of a flat plaque, the original part, or can be of another interior trim part, such as A, B, C pillars, package tray substrate, wheelhouse covers, tire covers and mud guards.

Some applications and market segments to which the products disclosed in this invention are targeted require enhanced flammability performance. In order to impart improved flammability characteristics to the molded articles of this invention, low viscosity, liquid chemical additives, known as flame retardants, can be incorporated in the mixture comprised of fluff and binder prepared as described above. These additives can also be blended with the binder prior to its addition to the fluff. Addition of liquid flame retardants of this invention either to the fluff and binder mixture or to the binder can take place at temperatures ranging from 10° C. to 50° C. Flame retardants' viscosities used in this invention range from 10 to 2000 cps, as measured at 25° C. In addition to improving flammability ratings of molded articles, low viscosity liquid flame retardants also modify binder viscosity to desired values. Low viscosity liquid flame retardants are selected so that they do not chemically react with isocyanates, polyols, or isocyanate prepolymers, as defined above. Amount of added flame retardant may range from 10 to 50 percent by weight of the final fluff mixture, preferably 10 to 30 percent. The liquid low viscosity flame retardants used in this invention can be selected from, but not limited to, the following group of chemicals: low viscosity, liquid phosphorus-bromine flame retardants, bromoaromatic flame retardants, halogenated aliphatic phosphorus flame retardants, non-halogenated aliphatic phosphorus flame retardants, halogenated aromatic phosphorus flame retardants and non-halogenated aromatic phosphorus flame retardants."

Example 1

Automotive headliner scrap material is shredded using a 75 HP granulator commercially available from Rapid at a 450 lbs/hr rate and using a 1" screen. The resulting fluff (22.2 g) was mixed for 2 minutes with 2.7 g (10.7% by weight of total blend) of isocyanate binder (2100 cps, 11.54% NCO) commercially available under the trade name Mistabond H3174 from Marchem, and 0.22 g of water (0.87% by weight of total blend) using a laboratory Hobart mixer at ambient temperature (22-25° C.). This mixture, which weighted 25.12 g, was transferred into a 4.5"×4.5" mold and compressed at 2200 psi. Heat and compression were applied using a Carver press. The sample was left in the press for 6 minutes at a temperature of 132° C. (270° F.). The produced plaque was 5.1 mm thick and had a surface density of 178.6 g/ft$^2$. It was flexible and could be bent without breaking.

Example 2

50.0 g of automotive headliner fluff produced as described in Example 1, was mixed for 2 minutes with 6.0 g (10.6% by weight of total blend) of isocyanate binder (2100 cps, 11.54% NCO) commercially available under the trade name Mistabond H3174 from Marchem, and 0.5 g of water (0.88% by weight of total blend) using a laboratory Hobart mixer at ambient temperature (22-25° C.). This mixture, which weighted 56.5 g, was transferred into a 4.5"×4.5" mold and compressed at 2200 psi. Heat and compression were applied using a Carver press. Sample was left in the press for 6 minutes at a temperature of 132° C. (270° F.). Produced plaque was 5.6 mm thick and had a surface density of 401.8 g/ft$^2$. It was stiff and could not be bent by hand.

Example 3

110.0 g of automotive headliner fluff produced as described in Example 1, was mixed for 2 minutes with 27.6 g (19.9% by weight of total blend) of isocyanate binder (2100 cps, 11.54% NCO) commercially available under the trade name Mistabond H3174 from Marchem and 1.0 g of catalyst commercially available under the trade name Mistabond P1064 (3.6% by weight of binder) from Marchem, using a laboratory Hobart mixer at ambient temperature (22-25° C.). This mixture, which weighted 138.6 g, was transferred into a 12"×12" mold and compressed at 2200 psi and room temperature for 1 hr. Prior to transfer of the mixture into the mold, the mold was sprayed with a mold release composition commercially available under the trade name MR-515 from Chem-Trend. The produced plaque was 3.0 mm thick and had a surface density of 138.6 g/ft$^2$. It was flexible and could be bent without breaking.

Example 4

55.0 g of automotive headliner fluff produced as described in Example 1, was mixed for 2 minutes with 13.8 g (19.9% by weight of total blend) of isocyanate binder (2100 cps, 11.54% NCO) commercially available under the trade name Mistabond 113174 from Marchem and 0.5 g of catalyst commercially available under the trade name Mistabond P1064 (3.6% by weight of binder) from Marchem, using a laboratory Hobart mixer at ambient temperature (22-25° C.). This mixture, which weighted 69.3 g, was transferred into a 12"×12" mold and compressed at 2200 psi and room temperature for 1 hr. Prior to transfer of the mixture into the mold, the mold was sprayed with a mold release composition commercially available under the trade name MR-515 from Chem-Trend. The produced plaque was 1.5 mm thick and had a surface density of 69.3 g/ft$^2$. It was flexible and could be bent without breaking.

Example 5

57.0 g of automotive headliner fluff produced as described in Example 1, was mixed for 2 minutes with 11.4 g (16.5% by weight of total blend) of isocyanate binder (2100 cps, 11.54% NCO) commercially available under the trade name Mistabond H3174 from Marchem and 0.5 g of catalyst commercially available under the trade name Mistabond P1064 (4.38% by weight of binder) from Marchem, using a laboratory Hobart mixer at ambient temperature (22-25° C.). This mixture, which weighted 68.9 g, was transferred into a 12"×12" mold and compressed at 2200 psi and room temperature for 1 hr. Prior to transfer of the mixture into the mold, the mold was sprayed with a mold release composition commercially available under the trade name MR-515 from Chem-Trend. The produced plaque was 2.0 mm thick and had a surface density of 68.9 g/ft². It was flexible.

Example 6

Automotive trunk trim scrap material, which is comprised of a thin sheet of polypropylene resin sandwiched between two layers of non-woven polyester fibers, is shredded using a 75 HP granulator commercially available from Rapid at a 500 lbs/hr rate and using a 1" screen. The resulting fluff (50.0 g) was mixed for 3 minutes with 6.9 g (12.0% by weight of total blend) of a mixture of isocyanate binder (4800 cps, 13.0% NCO) commercially available under the trade name Mistabond H3164 from Marchem. 0.75% by weight of binder of a catalyst commercially available under the trade name Mistabond ZA2084 from Marchem, and 0.5 g of water (0.87% by weight of total blend) using a laboratory Hobart mixer at ambient temperature (22-25° C.). Binder and catalyst were premixed at ambient temperature (22-25° C.) before addition to the fluff. The overall mixture, which weighted 57.4 g, was transferred into a 4.5"×4.5" mold and compressed at 2200 psi. Heat and compression were applied using a Carver press. The sample was left in the press for 10 minutes at a temperature of 132° C. (270° F.). The produced plaque was 6.4 mm thick and had a surface density of 408 g/ft². It was flexible and could be bent without breaking.

Example 7

50.0 g of automotive trunk trim fluff produced as described in Example 6, was mixed for 2 minutes with 6.4 g (11.3% by weight of total blend) of isocyanate binder (4800 cps, 13.0% NCO) commercially available under the trade name Mistabond H3164 from Marchem and 0.2 g (3.1% by weight of binder) of a catalyst commercially available under the trade name Mistabond P1005 from marchem, using a laboratory Hobart mixer at ambient temperature (22-25° C.). Binder and catalyst were premixed at ambient temperature (22-25° C.) before addition to the fluff. The overall mixture, which weighted 56.6 g, was transferred into a 4.5"×4.5" mold and compressed at 2200 psi. Heat and compression were applied using a Carver press. The sample was left in the press for 6 minutes at a temperature of 132° C. (270° F.). The produced plaque was 6.4 mm thick and had a surface density of 402.5 g/ft². It was stiffer than plaque of example 6 but still could be bent without breaking.

Example 8

40.0 g of automotive trunk trim fluff produced as described in Example 6, was mixed for 2 minutes with 4.8 g (10.6% by weight of total blend) of isocyanate binder (2100 cps, 11.54% NCO) commercially available under the trade name Mistabond H3174 from Marchem and 0.4 g of water (0.88% by weight of total blend) using a laboratory Hobart mixer at ambient temperature (22-25° C.). The overall mixture, which weighted 45.2 g, was transferred into a 4.5"×4.5" mold and compressed at 2200 psi. Heat and compression were applied using a Carver press. The sample was left in the press for 6 minutes at a temperature of 132° C. (270° F.). The produced plaque was 5.3 mm thick and had a surface density of 321.4 g/ft². It had about the same stiffness as plaques of Example 7.

Example 9

50.0 g of carpet trim fluff produced as described in Example 6, was mixed for 2 minutes with 12.8 g (20.2% by weight of total blend) of isocyanate binder (4800 cps, 13.0% NCO) commercially available under the trade name Mistabond H3164 from Marchem and 0.4 g (3.1% by weight of binder) of a catalyst commercially available under the trade name Mistabond P1005 from Marchem, using a laboratory Hobart mixer at ambient temperature (22-25° C.). Binder and catalyst were premixed at ambient temperature (22-25° C.) before addition to the fluff. The overall mixture, which weighted 63.2 g, was transferred into a 4.5"×4.5" mold and compressed at 2200 psi. Heat and compression were applied using a Carver press. The sample was left in the press for 6 minutes at a temperature of 132° C. (270° F.). The produced plaque was 6.0 mm thick and had a surface density of 450 g/ft². It was stiffer than plaque of example 6 but still could be bent without breaking.

Example 10

132.8 g of automotive headliner fluff produced as described in Example 1, was mixed for 2 minutes with 26 g (16.25% by weight of total blend) of isocyanate binder (2100 cps, 11.54% NCO) commercially available under the trade name Mistabond H3174 from Marchem and 1.2 g of catalyst commercially available under the trade name Mistabond P1064 (4.6% by weight of binder) from Marchem, using a drill with a mortar mixing blade at ambient temperature (22-25° C.). This mixture, which weighted 160.0 g, was transferred into a 12"×12" mold; a 0.2 mm thick polyester film commercially available under the trade name Mylar from DuPont Teijin Films Partnership was placed onto the top of the mold. The resulting product was compressed at 3500 psi and room temperature for 1 hr. Prior to transfer of the mixture into the mold, the mold was sprayed with a mold release composition commercially available under the trade name MR-515 from Chem-Trend. The produced laminated plaque was 3.5 mm thick and had a surface density of 160.0 g/ft². The film was adhered to the rebonded fluff.

I claim:
1. A method of producing useful articles from recycled materials, comprising the steps of:
   shredding scrap material to produce fluff;
   mixing the fluff only with a non-aqueous, isocyanate prepolymer adhesive or binder; and
   curing the mixture to form a desired shape without adding any additional water to the mixture.
2. The method of claim 1, wherein the scrap material includes automotive interior trim parts.
3. The method of claim 1, wherein the curable isocyanate prepolymer adhesive or binder is produced by reacting an isocyanate component with an isocyanate-reactive component in a container.
4. The method of claim 3, wherein the isocyanate component is selected from the group consisting of: a diisocyanate, a polyisocyanate, toluene diisocyanate (TDI), methylene diphenyl diisocyanate (MDI), dimers, trimers, and higher oligomers thereof, and mixtures thereof.

5. The method of claim 4, wherein the polyisocycanate is selected from the group consisting of: prepolymers, free polyisocyanates and a mixture thereof.

6. The method of claim 3, wherein the isocyanate component includes a combination of toluene diisocyanate (TDI) and methylene diphenyl diisocyanate (MDI).

7. The method of claim 3, wherein the isocyanate-reactive component is a polyol.

8. The method of claim 3, wherein the isocyanate-reactive component is at least two polyols.

9. The method of claim 1, further including the step of adding an extender or process oil to the mixture to adjust viscosity.

10. The method of claim 1, further including the use of a catalyst.

11. The method of claim 1, including the step of placing the mixture into a mold to cure.

12. The method of claim 1, including the step of curing the mixture into a continuous web or between laminating rolls under pressure.

13. The method of claim 1, wherein the adhesive or binder is metered into the fluff in a container.

14. The method of claim 1, including the steps of:
metering the mixture onto a pressurized, continuous belt or between laminating rolls as a continuous web or batting; and
cutting the resulting cured web into flat panels of desired sizes.

15. The method of claim 1, further including the step of covering one or both sides of the cured shape with a textile or other coverstock, polymeric film, sheet or scrim.

16. The method of claim 1, further including the step of covering one or both sides of the cured shape with a textile or other coverstock, polymeric film, sheet or scrim without the use of an additional adhesive.

17. The method of claim 10, wherein the curing takes place at a temperature in the range of 10 to 200° C.

18. The method of claim 10, wherein the curing takes place at a temperature in the range of 15 to 50° C.

19. The method of claim 1, further including the step of adding glass fibers to the mixture prior to curing.

* * * * *